United States Patent
Chen et al.

(10) Patent No.: US 9,891,976 B2
(45) Date of Patent: Feb. 13, 2018

(54) ERROR DETECTION CIRCUITRY FOR USE WITH MEMORY

(71) Applicant: ARM Limited, Cambridge (GB)

(72) Inventors: Andy Wangkun Chen, Austin, TX (US); Mudit Bhargava, Austin, TX (US); Paul Gilbert Meyer, Rollingwood, TX (US); Vikas Chandra, Fremont, CA (US)

(73) Assignee: ARM Limited, Cambridge (GB)

( * ) Notice: Subject to any disclaimer, the term of this patent is extended or adjusted under 35 U.S.C. 154(b) by 0 days.

(21) Appl. No.: 14/633,062

(22) Filed: Feb. 26, 2015

(65) Prior Publication Data

US 2016/0253227 A1    Sep. 1, 2016

(51) Int. Cl.
*G06F 11/10* (2006.01)
*G06F 11/07* (2006.01)
*G06F 11/08* (2006.01)

(52) U.S. Cl.
CPC .......... *G06F 11/076* (2013.01); *G06F 11/085* (2013.01); *G06F 11/1012* (2013.01); *G06F 11/1016* (2013.01)

(58) Field of Classification Search
CPC .................................................. G06F 11/1008
USPC ........................................ 714/763, 764, 768
See application file for complete search history.

(56) References Cited

U.S. PATENT DOCUMENTS

| | | |
|---|---|---|
| 3,699,322 A | 10/1972 | Dorr |
| 5,090,035 A | 2/1992 | Murase |
| 5,193,092 A | 3/1993 | Hartoog et al. |
| 5,434,871 A | 7/1995 | Purdham et al. |
| 5,523,707 A | 6/1996 | Levy et al. |
| 5,623,506 A | 4/1997 | Dell et al. |
| 5,719,880 A * | 2/1998 | Leung .................... G11C 29/16 365/230.02 |
| 5,748,912 A * | 5/1998 | Lee ........................ G06F 1/1616 703/27 |
| 5,757,823 A | 5/1998 | Chen et al. |
| (Continued) | | |

FOREIGN PATENT DOCUMENTS

EP    0 473 819 A1    3/1992

OTHER PUBLICATIONS

PCT International Search Report and Written Opinion; PCT/GB2016/050500; May 2, 2016.

(Continued)

*Primary Examiner* — Fritz Alphonse
(74) *Attorney, Agent, or Firm* — Pramudji Law Group PLLC; Ari Pramudji

(57) ABSTRACT

Various implementations described herein may refer to and may be directed to error detection circuitry for use with memory. In one implementation, an integrated circuit may include a memory array having a plurality of rows of memory cells, where a respective row is configured to store a data word and one or more check bits corresponding to the data word. The integrated circuit may also include inline error detection circuitry coupled to the respective row and configured to generate one or more flag bit values based on a detection of one or more bit errors in the data word stored in the respective row. The integrated circuit may further include error correction circuitry configured to correct the one or more bit errors in the data word stored in the respective row in response to the one or more generated flag bit values.

11 Claims, 9 Drawing Sheets

(56) References Cited

U.S. PATENT DOCUMENTS

| | | |
|---|---|---|
| 5,784,427 A | 7/1998 | Bennett et al. |
| 5,809,273 A * | 9/1998 | Favor .................. G06F 9/30152 712/210 |
| 6,018,304 A | 1/2000 | Bessios |
| 6,130,866 A | 10/2000 | Shigenobu et al. |
| 6,137,734 A | 10/2000 | Schoner |
| 6,181,164 B1 | 1/2001 | Miller |
| 6,262,596 B1 | 7/2001 | Schultz et al. |
| 6,266,710 B1 | 7/2001 | Dittmer et al. |
| 6,275,311 B1 | 8/2001 | Boffi et al. |
| 6,295,626 B1 | 9/2001 | Nair et al. |
| 6,332,173 B2 | 12/2001 | Typaldos |
| 6,433,725 B1 | 8/2002 | Chen et al. |
| 6,457,154 B1 | 9/2002 | Chen et al. |
| 6,938,198 B1 | 8/2005 | Purcell |
| 7,278,085 B1 | 10/2007 | Weng et al. |
| 7,283,380 B1 | 10/2007 | Srinivasan et al. |
| 7,589,362 B1 | 9/2009 | Argyres et al. |
| 8,005,209 B2 | 8/2011 | Joshi et al. |
| 8,225,187 B1 | 7/2012 | Schultz et al. |
| 9,122,625 B1 | 9/2015 | Lu et al. |
| 9,529,671 B2 | 12/2016 | Chandra et al. |
| 2003/0058896 A1 | 3/2003 | Boerker |
| 2003/0061558 A1 | 3/2003 | Fackenthal et al. |
| 2004/0078728 A1 | 4/2004 | Tremblay et al. |
| 2004/0117723 A1 | 6/2004 | Foss |
| 2004/0190357 A1 * | 9/2004 | Scheuerlein ......... G11C 7/1006 365/222 |
| 2005/0204274 A1 | 9/2005 | Kamp et al. |
| 2005/0223208 A1 | 10/2005 | Moran et al. |
| 2005/0268209 A1 | 12/2005 | Mann |
| 2005/0289441 A1 | 12/2005 | Kawagoe et al. |
| 2006/0156214 A1 | 7/2006 | Kikutake et al. |
| 2007/0044045 A1 | 2/2007 | Zhuang |
| 2007/0186268 A1 | 8/2007 | Mcneely |
| 2007/0250755 A1 | 10/2007 | Burleson et al. |
| 2008/0040519 A1 | 2/2008 | Starr et al. |
| 2008/0040652 A1 | 2/2008 | Ausserlechner |
| 2008/0195915 A1 | 8/2008 | Leonard et al. |
| 2009/0164870 A1 | 6/2009 | Penton et al. |
| 2009/0249175 A1 | 10/2009 | Chandra et al. |
| 2010/0088565 A1 | 4/2010 | Chandra |
| 2011/0099451 A1 | 4/2011 | Wezelenburg et al. |
| 2011/0225475 A1 | 9/2011 | Kumar et al. |
| 2011/0231732 A1 | 9/2011 | Chu |
| 2011/0320919 A1 | 12/2011 | Ambroladze et al. |
| 2012/0240014 A1 | 9/2012 | Georgakos et al. |
| 2012/0303986 A1 | 11/2012 | Flynn et al. |
| 2013/0283115 A1 | 10/2013 | Sazeides et al. |
| 2014/0070867 A1 | 3/2014 | Dutton |
| 2014/0089769 A1 | 3/2014 | Priebe et al. |
| 2014/0325303 A1 | 10/2014 | Yang et al. |
| 2015/0041625 A1 | 2/2015 | Dutton et al. |
| 2015/0248323 A1 | 9/2015 | Barner |
| 2015/0276867 A1 | 10/2015 | Alvarez-Icaza Rivera et al. |
| 2015/0363267 A1 | 12/2015 | Chandra et al. |
| 2015/0363268 A1 | 12/2015 | Chandra et al. |

OTHER PUBLICATIONS

Kim, et al; Multi-bit Error Tolerant Caches Using Two-Dimensional Error Coding; Proceedings of the 40th Annual acm/ieee International Symposium on Microarchitecture (MICRO-40); Dec. 2007. https://www.ece.cmu.edu/~truss/papers/micro07-multibit.pdf.

Yoon, et al.; Memory Mapped ECC: Low-Cost Error Protection for Last Level Caches; Proceedings of ISCA'09; ACM; 2009. http://users.ece.utexas.edu/~merez/mme_isca09.pdf.

Phelps; Constructing an Error Correcting Code; Nov. 9, 2009. http://pages.cs.wisc.edu/~markhill/cs552/Fall2006/handouts/ConstructingECC.pdf.

Parity & Computing Parity; May 10, 2005; http://akbar.marlboro.edu/~mahoney/courses/Fall01/computation/compression/hamming/parity.htm.

Error Detection and Correction; Supplement to Logic and Computer Design Fundamentals 3rd Edition1; Pearson Education; 2004 http://logos.cs.uic.edu/366/notes/ErrorCorrectionAndDetectionSupplement.pdf.

UKIPO Examination Report; GB 1507706.8; dated Nov. 18, 2016.
UKIPO Examination and Search Report; GB 1507706.8; dated Nov. 30, 2015.

Bergstra; A Formal Approach to Concurrent Error Detection in FPGA LUTS; McMaster University, Canada; pp. 1-83; Jul. 2012.

Crop, et al.; Error Detection and Recovery Techniques for Variation-Aware CMOS Computing: A Comprehensive Review; Journal of Low Power Electronics and Applications; pp. 334-356; Oct. 11, 2011.

Palframan, et al.; Time Redundant Parity for Low-Cost, Transient Error Detection; EDAA; pp. 1-6; 2011.

Das, et al.; Razor II: In Situ Error Detection and Correction for PVT and SER Tolerance; IEEE; vol. 44, No. 1; pp. 32-45; Jan. 2009.

Almukhaizim, et al.; Concurrent Error Detection Methods for Asynchronous Burst-Mode Machines; IEEE; vol. 56, No. 6; pp. 785-798; Jun. 2007.

Damm, et al.; State Assignment for Detecting Erroneous Transitions in Finite State Machines; IEEE; pp. 1-8; 2006.

Almukhaizim, et al.; On Concurrent Error Detection with Bounded Latency in FSMs; IEEE; pp. 1-6; 2004.

Mitra, et al.; Which Concurrent Error Detection Scheme to Choose ?; IEEE International Test Conference; 2000.

* cited by examiner

ERROR DETECTION CIRCUITRY FOR USE WITH MEMORY

BACKGROUND

This section is intended to provide information relevant to understanding various technologies described herein. As the section's title implies, this is a discussion of related art that should in no way imply that it is prior art. Generally, related art may or may not be considered prior art. It should therefore be understood that any statement in this section should be read in this light, and not as any admission of prior art.

Integrated circuits (IC) may be formed from arrangements of one or more input/output devices, standard devices, memory devices, and/or the like. In one scenario, memory devices may include memory arrays arranged into memory cells and the associated circuitry to write data to the memory cells and read data from the memory cells.

In particular, the memory cells of a memory array, such as a random access memory (RAM) array, may be organized into rows and columns. The logic latches within these individual memory cells may be used to store a data bit that is representative of a logical "1" or "0." These memory cells may also be interconnected by word-lines (WL) and pairs of complementary bit-lines (BL).

In a further scenario, the memory array may be vulnerable to errors. In particular, these errors may be soft errors, where the state of the data bits stored in the memory array can be changed. In such a scenario, a read operation performed on the memory array may produce incorrect values. As process geometries shrink, and as memory arrays decrease in size, these memory arrays may become increasingly vulnerable to errors. In some scenarios, techniques for detecting such errors may be used.

BRIEF DESCRIPTION OF THE DRAWINGS

Implementations of various techniques will hereafter be described herein with reference to the accompanying drawings. It should be understood, however that the accompanying drawings illustrate only various implementations described herein and are not meant to limit the scope of various technologies described herein.

DETAILED DESCRIPTION

Various implementations described herein may refer to and may be directed to error detection circuitry for use with memory. For instance, in one implementation, an integrated circuit may include a memory array having a plurality of rows of memory cells, where a respective row is configured to store a data word and one or more check bits corresponding to the data word. The integrated circuit may also include inline error detection circuitry coupled to the respective row and configured to generate one or more flag bit values based on a detection of one or more bit errors in the data word stored in the respective row. The integrated circuit may further include error correction circuitry configured to correct the one or more bit errors in the data word stored in the respective row in response to the one or more generated flag bit values.

Various implementations of error detection circuitry for use with memory will now be described in more detail with reference to FIGS. 1-10.

As noted above, integrated circuits (IC) may be formed from arrangements of one or more input/output devices, standard devices, memory devices, and/or other devices. Input/output devices may be used to provide signals between the connection pins of the IC and the standard devices and memory devices arranged within the IC. Standard devices may be circuit implementations of flip-flops, arithmetic logic units, multiplexors, retention flops, balloon flops, latches, logic gates, and/or the like. Memory devices may include memory arrays arranged into memory cells and the associated circuitry to write data to the memory cells and read data from the memory cells.

Figure 1:
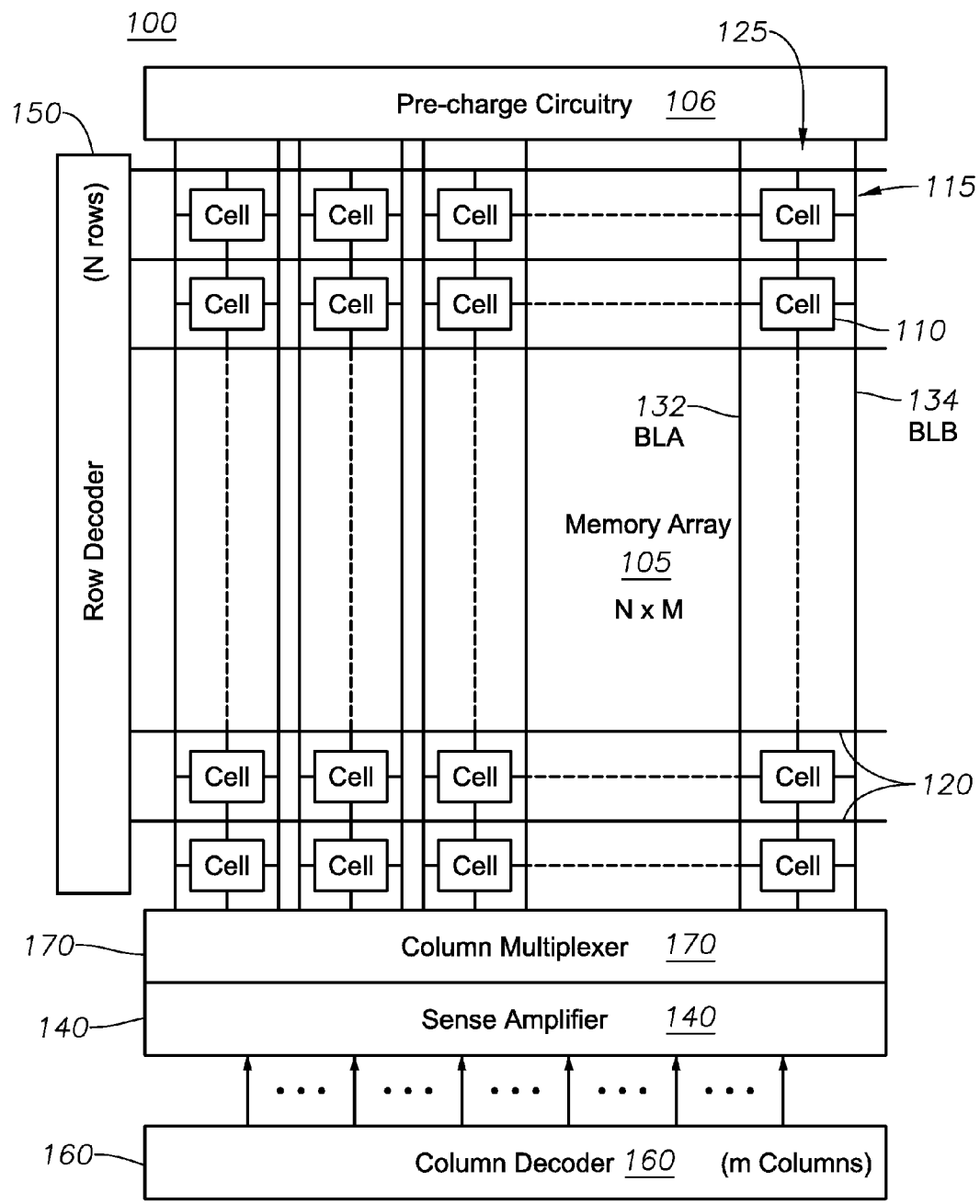
FIG. 1 illustrates a block diagram of an embedded memory device in connection with various implementations described herein.

For example, FIG. 1 illustrates a block diagram of an embedded memory device 100 in connection with various implementations described herein. The memory device 100 may include a memory array 105, pre-charge circuitry 106, row decoder 150, one or more column multiplexors 170, one or more sense amplifiers 140, and column decoder 160.

In particular, the memory array 105 may be a random-access memory (RAM) array, such as a static RAM (SRAM) array, a dynamic RAM (DRAM) array, a correlated electron RAM (ceRAM) array, a ferroelectric RAM (feRAM) array, and/or any other implementation known to those skilled in the art. In some implementations, the memory array 105 may be implemented as a single rail memory array, a dual rail memory array, or any other such implementation known to those skilled in the art.

The memory array 105 may include a plurality of individual memory cells 110, which may be organized in rows 115 and columns 125. As shown in FIG. 1, the array may have N rows and M columns, and, therefore, may have N×M individual memory cells 110. Each memory cell 110 may be used to store a data bit that is representative of a logical "1" or "0".

As illustrated in FIG. 1, each row 115 of memory cells 110 may be connected to at least one of a plurality of word-lines (WL) 120, where each word-line 120 may activate a particular row of memory cells 110. A row decoder 150 may receive address information (e.g., an address word) and then enable the row 115 corresponding to the address word. In some implementations, each row 115 of memory cells 110 may be used to store a word of data. In other implementations, the row may store part of the word or multiple words, such as a half word or a double word.

Further, each column 125 of memory cells 110 may be connected to at least one of a plurality of column bit-lines (BL). In one implementation, a particular memory cell 110 may be coupled to at least one pair of complementary bit-lines, such as BLA 132 and BLB 134. The bit-lines may be used to either store a data bit into a particular cell 110 during a write operation, or to read a stored bit from the particular cell 110 during a read operation. A column decoder 160 may receive address information and enable columns 125 corresponding to the address. The number of columns 125 activated may depend on the size of the word to be stored.

One or more sense amplifiers 140 may be connected to the plurality of column bit-lines. The sense amplifier 140 may amplify differential voltage signals between the complementary bit-lines 132, 134 of the memory array 105 during a read operation. These small differential voltage signals may be representative of the data bit stored in selected particular individual memory cell 110.

In one implementation, one or more column multiplexers 170 may be used to multiplex the pair of complementary bit-lines in a column 125 into a single set of sense amplifiers 140, thereby reducing the number of sense amplifiers 140. In another implementation, during periods when there is no read or write operation, the pre-charge circuitry 106 may be enabled to pre-charge the voltage level on the complementary bit-lines 132, 134.

In a further implementation, the memory array 105 may be a multiport memory array. In such an implementation, the memory array 105 may have a plurality of write ports through which data bits can be written into the memory cells 110. The memory array 105 may also have a plurality of read ports through which data bits can be read from the memory cells 110. In another implementation, the memory array 105 may be a register file.

In some implementations, data bits stored in the memory array 105 can be vulnerable to corruption. In one such implementation, data bits stored in the array 105 may be vulnerable to soft errors, where the state of data stored in the memory array 105 can be changed. For example, a particle strike to the memory array 105 may cause a bit flip in the stored data. Other factors known to those skilled in the art may also cause the bit flip in the stored data.

To assist in the detection and handling of errors to the values of the stored data bits (i.e., bit errors), various error detection and/or correction techniques may be used. In some implementations, and as further described below, each row of a memory array may be coupled to inline error detection circuitry. The inline error detection circuitry may be used to detect bit errors in data stored in the rows using one or more check bits stored along with the data. In particular, the rows of the memory array may be continuously monitored for such bit errors, and the bit errors may be detected once they occur. In such an implementation, the bit errors may be detected in real-time or substantially near real-time. Further, error correction circuitry may then be used to correct the detected bit errors, such as, for example, by flipping an affected data bit to the correct value.

Inline Parity Detection

In one implementation, and as further described below, to detect and correct bit errors occurring in a memory array, inline error detection circuitry in the form of an inline parity checking circuitry may be used. The inline parity checking circuitry may be used to detect a bit error in data stored in a row of the memory array. The inline parity checking circuitry may use one or more check bits, hereinafter referred to as one or more parity bits. The one or more parity bits may be stored alongside the data. Further, error correction circuitry in the form of an error-correcting code (ECC) correction circuitry may be used to correct the bit error.

Figure 2:
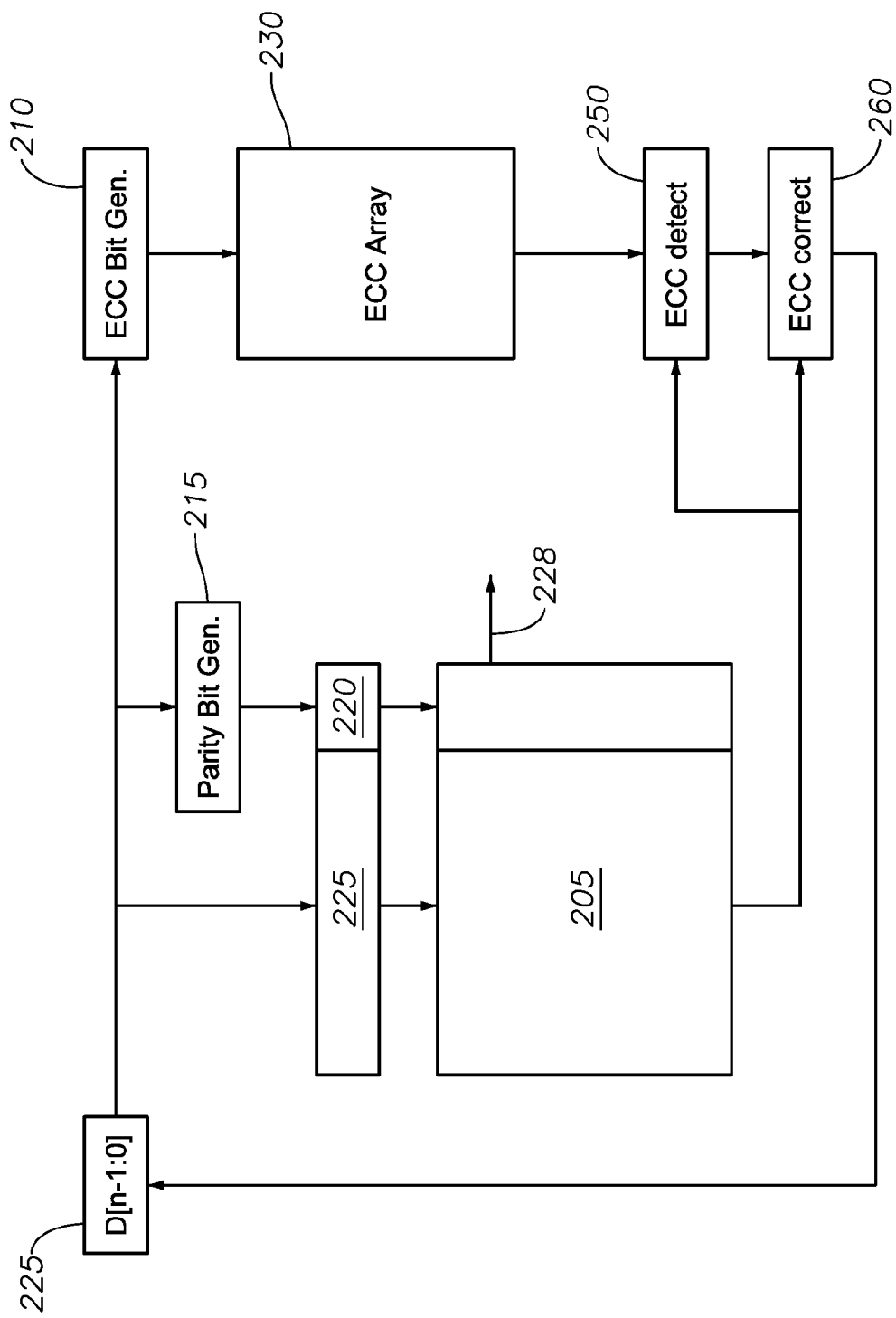
FIG. 2 illustrates a block diagram of a memory array which utilizes inline parity checking circuitry and ECC correction circuitry in accordance with various implementations described herein.

FIG. 2 illustrates a block diagram of a memory array 205 which utilizes inline parity checking circuitry (not shown) and ECC correction circuitry 260 in accordance with various implementations described herein. In addition, the memory array 205 may also utilize ECC bit generation circuitry 210, parity generation circuitry 215, ECC array 230, and ECC detection circuitry 250.

Memory array 205 may be similar to the memory array 105 as described above. In particular, the memory array 205 may be configured to receive a plurality of data bits during a write operation, where the data bits are to be written into a particular row of memory cells of the array 205. The memory cells may be implemented using flip-flops and/or any other circuitry known to those skilled in the art. As shown in FIG. 2, for each write operation, a data word 225 composed of n data bits may be written to a row of the array 205. The data word may also be designated as D[n−1:0] in FIG. 2. In implementations where the memory array 205 is a multiport array, the data word 225 may be written to the array 205 using one of a plurality of write ports.

Prior to the write operation, the data word 225 may be transmitted to the parity generation circuitry 215 to generate one or more parity bits 220, where the parity bits 220 may be derived based on the data bits of the data word 225. The following implementations may describe the use of a single parity bit, though other implementations may use a plurality of parity bits, as known to those skilled in the art.

In one implementation, the parity generation circuitry 215 may perform exclusive-OR (XOR) operations on all of the data bits in order to generate the single parity bit 220. In another implementation, the parity generation circuitry 215 may perform exclusive-NOR (XNOR) operations on all of the data bits in order to generate the single parity bit 220. For example, the parity generation circuitry 215 may include tree or chain of XOR and/or XNOR gates through which the data bits pass in order to generate the single parity bit 220. In such an implementation, the output of the XOR gates may indicate whether the data word has an even or odd number of "1" bits. Depending on whether an even or odd parity configuration is employed, the parity bit 220 may be set to a "0" or a "1" value. Other implementations of the parity generation circuitry 215 known to those skilled in the art may be used.

In addition, prior to the write operation, the data word 225 may be transmitted to the ECC bit generation circuitry 210 to generate a plurality of ECC check bits, where the ECC check bits may be derived based on the data bits of the data word 225. The ECC bit generation circuitry 210 may be composed of combinational logic configured to generate the ECC check bits based on error-correcting codes, such as Hamming codes or any other implementation known to those skilled in the art. The data bits of the data word 225 may pass through the combinational logic to generate the ECC check bits. The ECC check bits may be generated by the ECC bit generation circuitry 210 independently of a read or write operation on the memory array 205.

The ECC check bits may be stored in the ECC array 230. The ECC array 230 may be composed of a plurality of rows of standard cell flip-flop circuitry, where the ECC array 230 may be positioned separately from the memory array 205. In one implementation, the ECC array 230 may be a single port memory array. In such an implementation, if the memory array 205 is a multiport array, then a multiplexer may be used on the plurality of write ports to provide an input to the ECC array 230. The storage of the ECC check bits in the ECC array 230 may occur independently of a read or write operation on the memory array 205.

Returning to the parity generation circuitry 215, the parity bit 220 generated by the circuitry 215 may be stored with the data word 225 into a particular row of the memory array 205. In particular, the data word 225 and the parity bit 220 may be written into the same row of the array 205. In one implementation, and as shown in FIG. 2, the parity bit 220 may be written to a memory cell that is positioned to the immediate right of the stored data word 225 in the array 205.

After writing the data word 225 and the parity bit 220 into a row of the array 205, inline parity checking circuitry (not shown) may be used to detect a bit error in the stored data word 225. The inline parity checking circuitry may be disposed in a layout area of the memory array 205, where each row of the array 205 may be coupled to a respective inline parity checking circuitry. In particular, each memory cell of the row may be coupled to a particular stage of its respective inline parity checking circuitry. The layout area of the memory array 205 may be dominated by interconnects, thereby allowing for the positioning of the inline parity checking circuitry within the layout area of the array 205 without increasing layout requirements for the array 205.

The inline parity checking circuitry for a row may be composed of combinational logic circuitry configured to do a parity check for the row. In particular, the occurrence of a bit error in the data word 225 stored in the row may be continuously monitored by the inline parity checking circuitry. Further, the coupling of the inline parity checking circuitry to rows of the array 205 may allow for the circuitry to operate without the need for a read operation of the rows.

The inline parity checking circuitry for a row may generate one or more flag bit values 228 in the event that a bit error occurs in the data word 225 stored in the row. The following implementations may describe the use of a single flag bit, though other implementations may use a plurality of flag bits, as known to those skilled in the art.

In particular, the circuitry may generate a high value for the flag bit 228 (i.e., a logic "1" value) if the circuitry detects the occurrence of a bit error. Each row of the array 205 may have its own associated flag bit 228. The flag bit value 228 may be generated using combinational logic circuitry which uses an output of the inline parity checking circuitry. In one implementation, the flag bit value 228 may be stored in a memory cell, a separate array of flip-flop circuitry, and/or the like. In another implementation, the flag bit value 228 may be used as an input value to other circuitry of the IC, as further described below.

In another implementation, the inline parity checking circuitry may generate the flag bit value 228 in a concurrent fashion, where the flag bit value 228 is generated simultaneously or substantially near simultaneously with the occurrence of the bit error in the stored data word 225. In such an implementation, the inline parity checking circuitry may be operating in real-time or substantially near real-time. Generating the flag bit value 228 in such a concurrent fashion may prevent a scenario where two bit errors occur in the stored data word 225 before the inline parity checking circuitry is able to detect the first bit error. In such a scenario, the inline parity checking circuitry would not be able to detect the presence of any bit errors if the two bit errors occur prior to detection by the circuitry. Generating the flag bit value 228 in concurrent fashion may prevent such issues.

Various implementations of the inline parity checking circuitry may be used. In one implementation, the inline parity checking circuitry for a row may be similar to the circuitry used in the parity generation circuitry 215. For example, the inline parity checking circuitry may perform XOR and/or XNOR operations on all of the stored data bits in order to generate a second parity bit for a particular row. For example, the inline parity checking circuitry may include a tree or chain of XOR gates used to generate the second parity bit. In such an implementation, the inline parity checking circuitry may include compare circuitry, where the compare circuitry may be used to compare the values of the stored parity bit 220 and the second parity bit for the row. If the stored parity bit 220 and the second parity bit do not match, then a bit error may have occurred in the stored data word 225. The inline parity checking circuitry may then output a flag bit 228 having a high value.

Figure 3:
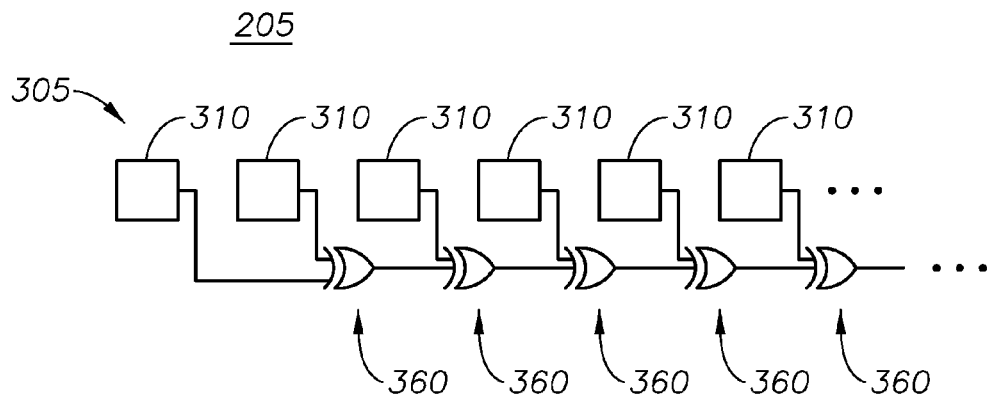
FIG. 3 illustrates a chained set of XOR gates coupled to a row of a memory array in accordance with various implementations described herein.

In another implementation, the inline parity checking circuitry for a particular row may be composed of a linear concatenation of logic circuitry, where each stage of the logic circuitry uses a data bit stored in a corresponding memory cell as an input. For example, the linear concatenation of logic circuitry may be in the form of a chained set of XOR gates, with one XOR gate (i.e., one stage of the logic circuitry) being associated with each memory cell of the row. FIG. 3 illustrates a chained set of XOR gates 360 coupled to a row 305 of the array 205 in accordance with various implementations described herein.

As shown in FIG. 3, each XOR gate 360 may receive a stored data bit from its associated memory cell 310 as one input. The other input for each XOR gate 360 may be the output of the previous XOR gate 360. As shown, the leftmost memory cell 310 may not have an associated XOR gate 360, and may use its stored data bit as an input for the subsequent XOR gate 360. The final output of the chained set of XOR gates 360 may indicate whether there are an odd or even number of "1" bits in the stored data word 225. Depending on whether an even or odd parity configuration is employed, the output may indicate whether a bit error may have occurred in the stored data word 225. This output may be used to generate a value for a flag bit 228 for the row.

Referring again to FIG. 2, in one implementation, the flag bit value 228 generated by the inline parity checking circuitry may be used as an input value to other circuitry of the IC, as mentioned above. In particular, the flag bit value 228 may be used by the ECC detection circuitry 250 and/or the ECC correction circuitry 260 to correct the bit error in the stored data word 225. In one implementation, a processor, a memory controller, and/or the like may receive the flag bit value 228. In the event that the flag bit value 228 is high, the processor, memory controller, and/or the like may enable the ECC detection circuitry 250 and/or the ECC correction circuitry 260 to correct the bit error in the stored data word 225.

The ECC detection circuitry 250 may be used to receive the stored data word 225 having the bit error, use the stored ECC check bits mentioned above to determine where the bit error is located in the stored data word 225, and generate an error flag to indicate to the system that a corrected version of the stored data word 225 is to be written into the memory array 250.

In particular, in the event that the flag bit value 228 is high, the memory controller may perform a read operation on the array 205 and read out the stored data word 225 corresponding to the flag bit value 228. In addition, the processor, memory controller, and/or the like may read out the ECC check bits from the ECC array 230 which correspond to the stored data word 225. The processor, memory controller, and/or the like may perform the above operations during idle cycles for the memory array 205, during periods where other read and/or write operations to the array 205 may not be occurring. In one implementation, the ECC check bits may be read out from the ECC array 230 in the background of read and/or write operations being performed on the memory array 205.

Figure 4:
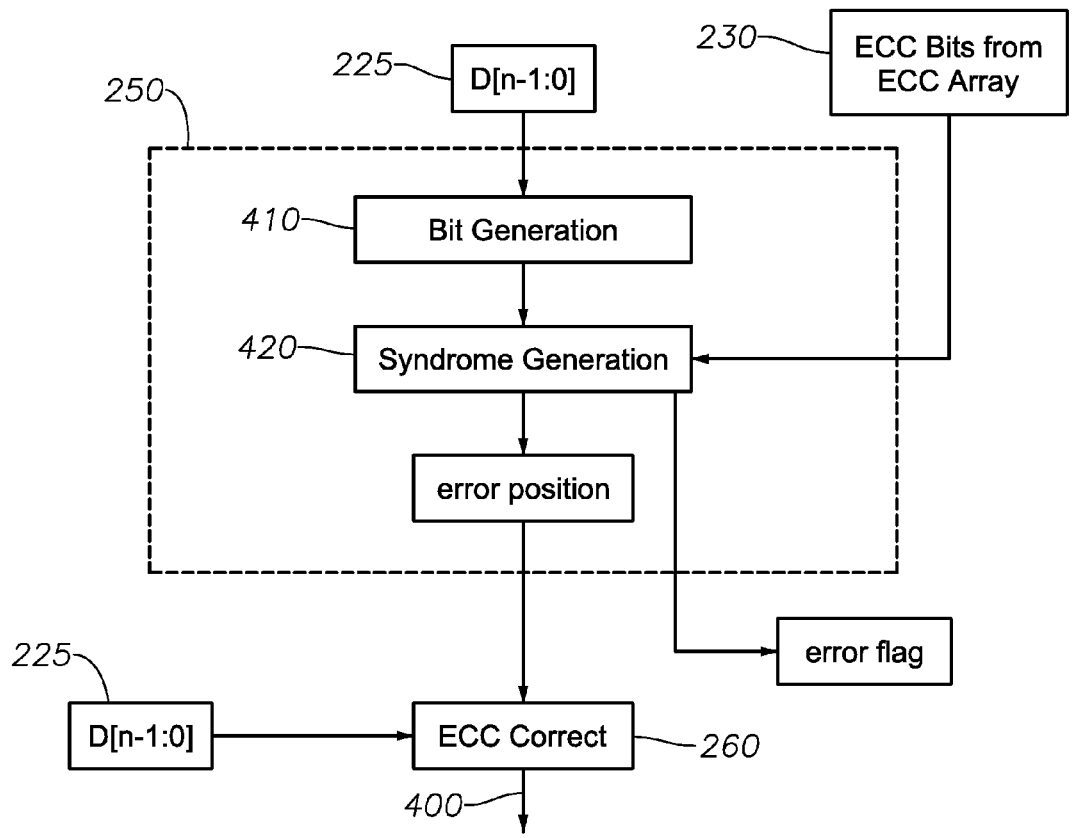
FIG. 4 illustrates a block diagram of ECC detection circuitry and ECC correction circuitry in accordance with various implementations described herein.

The read out stored data word 225 may be received by the ECC detection circuitry 250. FIG. 4 illustrates a block diagram of ECC detection circuitry 250 and the ECC correction circuitry 260 in accordance with various implementations described herein. The ECC detection circuitry 250 may include bit generating circuitry 410 and syndrome generating circuitry 420. Other implementations of the ECC detection circuitry 250 known to those skilled in the art may be used.

In particular, the bit generating circuitry 410 may receive the stored data word 225. Similar to the ECC bit generation circuitry 210 discussed above, the bit generating circuitry 410 may be used to generate a plurality of second ECC check bits, where the second ECC check bits may be derived based on the data bits of the stored data word 225 that have been read out from the array 205. The combinational logic of the bit generating circuitry 410 and the ECC bit generation circuitry 210 may be the same.

The syndrome generating circuitry 420 may receive the second ECC check bits from the bit generating circuitry 410. In addition, the syndrome generating circuitry 420 may also receive the stored ECC check bits that have been read out from the ECC array 230. The syndrome generating circuitry 420 may include circuitry used to compare the stored ECC check bits to the second ECC check bits. In one implementation, the circuitry 420 may include a plurality of XOR gates to perform the comparison. Based on the comparison, if the stored ECC check bits and the second ECC check bits do not match, then the syndrome generating circuitry 420 may generate an error flag value to be read by the processor and/or the like, where the error flag value may indicate to the processor that a corrected version of the stored data word 225 is to be written to the memory array 205 at a later time. If the check bits match, then no such error flag value may be generated and no further corrective action may be taken.

Further, if the check bits do not match, then the comparison of the stored ECC check bits to the second ECC check bits may yield a position of the bit error in the stored data word 225. This position may also be referred to as the syndrome.

The ECC detection circuitry 250 may transmit the position of the bit error to the ECC correction circuitry 260 to correct the stored data word 225. In addition, as shown, the read out stored data word 225 may be received by the ECC correction circuitry 260. In one implementation, to correct the stored data word 225, the ECC correction circuitry 260 may invert the data bit corresponding to the position received from the ECC detection circuitry 250.

The resulting corrected data word 400 may be written to the memory array 205. In one implementation, the corrected data word 400 may replace the stored data word 225 in the array 205. In another implementation, the memory controller may use the error flag value from the ECC detection circuitry 250 to begin scheduling a write operation for the corrected data word 400. The memory controller may schedule such a write operation during idle cycles of read and/or write operations on the array 205.

Figure 5:
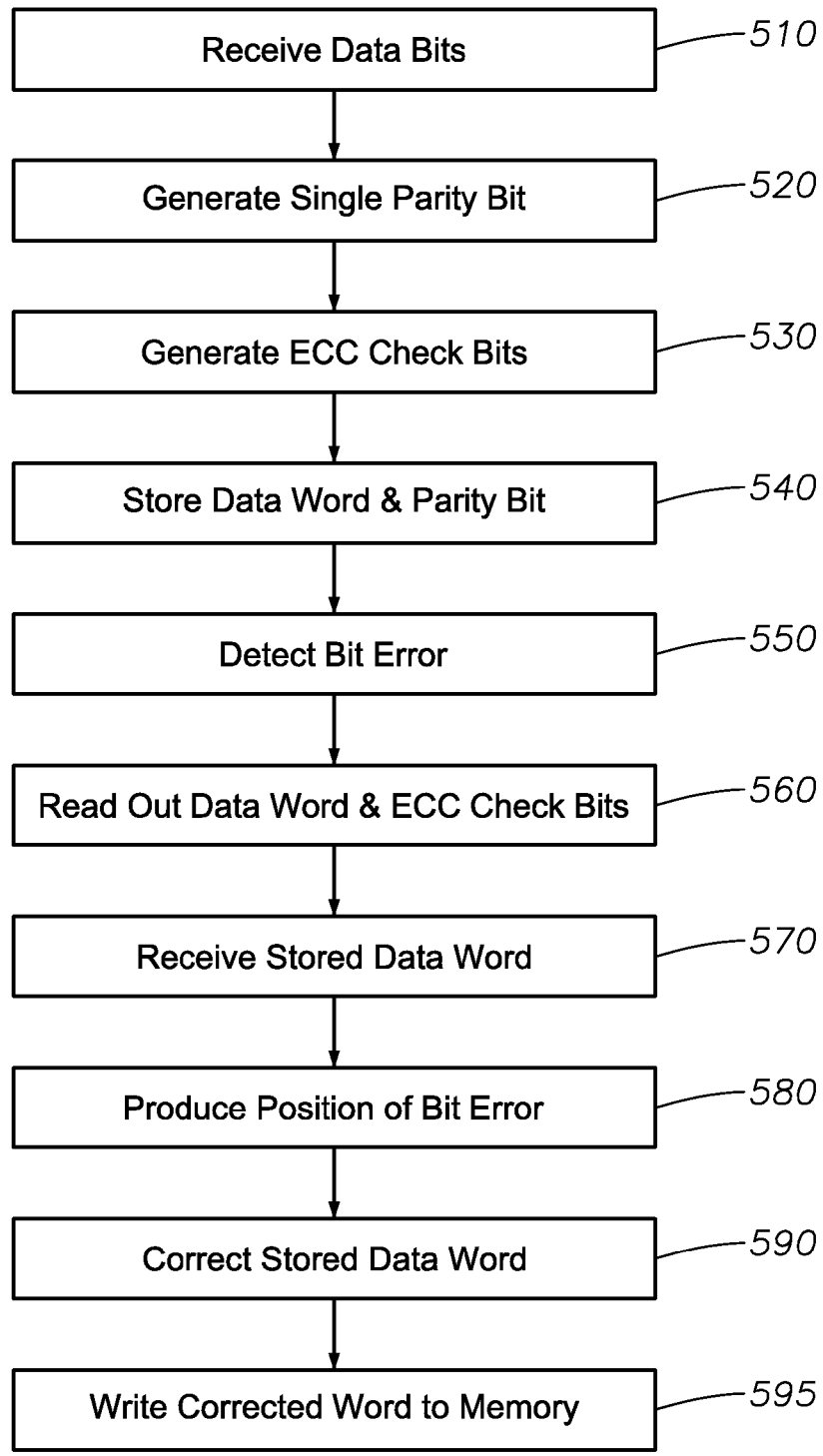
FIG. 5 illustrates a process flow diagram for a method of performing an inline error detection and an error correction on a memory array in accordance with various implementations described herein.

FIG. 5 illustrates a process flow diagram for a method 500 of performing an inline error detection and an error correction on a memory array in accordance with various implementations described herein. It should be understood that while method 500 indicates a particular order of execution of operations, in some implementations, certain portions of the operations might be executed in a different order, and on different systems. Further, in some implementations, additional operations or blocks may be added to the method. Likewise, some operations or blocks may be omitted.

At block 510, a memory array may be configured to receive a plurality of data bits during a write operation. In particular, the data bits of a data word may be written into a particular row of memory cells of the array.

At block 520, a single parity bit may be generated using parity generation circuitry based on the data bits. The parity bit may be generated prior to the write operation mentioned at block 510. In one implementation, the parity generation circuitry may perform XOR operations on all of the data bits in order to generate the single parity bit.

At block 530, a plurality of ECC check bits may be generated using ECC bit generation circuitry and based on the data word. The ECC check bits may be generated prior to the write operation mentioned at block 510. The ECC bit generation circuitry may be composed of combinational logic configured to generate the ECC check bits based on error-correcting codes. Further, the ECC check bits may be stored in an ECC array.

At block 540, the data word and the generated parity bit may be stored into a particular row of the memory array. In particular, the data word and the parity bit may be written into the same row of the array.

At block 550, a bit error in the stored data word may be detected using inline parity checking circuitry. The inline parity checking circuitry may be disposed in a layout area of the memory array, where each row of the array may be coupled to a respective inline parity checking circuitry. In particular, each memory cell of the row may be coupled to a particular stage of its respective inline parity checking circuitry. Further, the occurrence of a bit error in the data word stored in the row may be continuously monitored by the inline parity checking circuitry. In addition, the inline parity checking circuitry for a row may generate a flag bit value in the event that a bit error occurs in the data word stored in the row.

At block 560, the stored data word may be read out of the memory array and the ECC check bits corresponding to the stored data word may be read out from the ECC array. The read operations may be performed during idle cycles for the memory array.

At block 570, the stored data word may be received by the ECC detection circuitry. At block 580, if an error is detected, then the ECC detection circuitry may produce a position of the bit error in the stored data word. In one implementation, the position may be based on a comparison of ECC check bits.

At block 590, the ECC correction circuitry may correct the stored data word based on the position of the bit error received from the ECC detection circuitry. In one implementation, to correct the stored data word, the ECC correction circuitry may invert the data bit corresponding to the position received from the ECC detection circuitry. At block 595, the resulting corrected data word may be written to the memory array.

As discussed above, the implementations using the inline parity checking circuitry may be used to detect and correct bit errors in a data word in a memory array. In such implementations, the bit errors may be detected in real-time or substantially near real-time, as opposed to, for example, waiting until the data word is read out of the array before performing the detection and correction operations. Performing the detection using inline parity checking may allow for optimization of time in correcting bit errors. Further, especially for multiport memory arrays, the use of inline parity checking may lead to a saving of power by not having to implement error detection and checking circuitry for every read port of the array. In addition, the use of inline parity checking may lead to a detection of bit errors before such errors may accumulate in the array. The use of the separate ECC array may also allow for smaller sizes of the memory array.

Inline ECC Detection

In one implementation, and as further described below, to detect and correct bit errors occurring in a memory array, inline error detection circuitry in the form of an inline ECC detection circuitry may be used. The inline ECC detection circuitry may be used to detect one or more bit errors in data stored in a row of the memory array. The inline ECC detection circuitry may use a plurality of check bits, such as the ECC check bits discussed above. The ECC check bits may be stored alongside the data. Further, error correction circuitry in the form of ECC correction circuitry may be used to correct the bit error.

Figure 6:
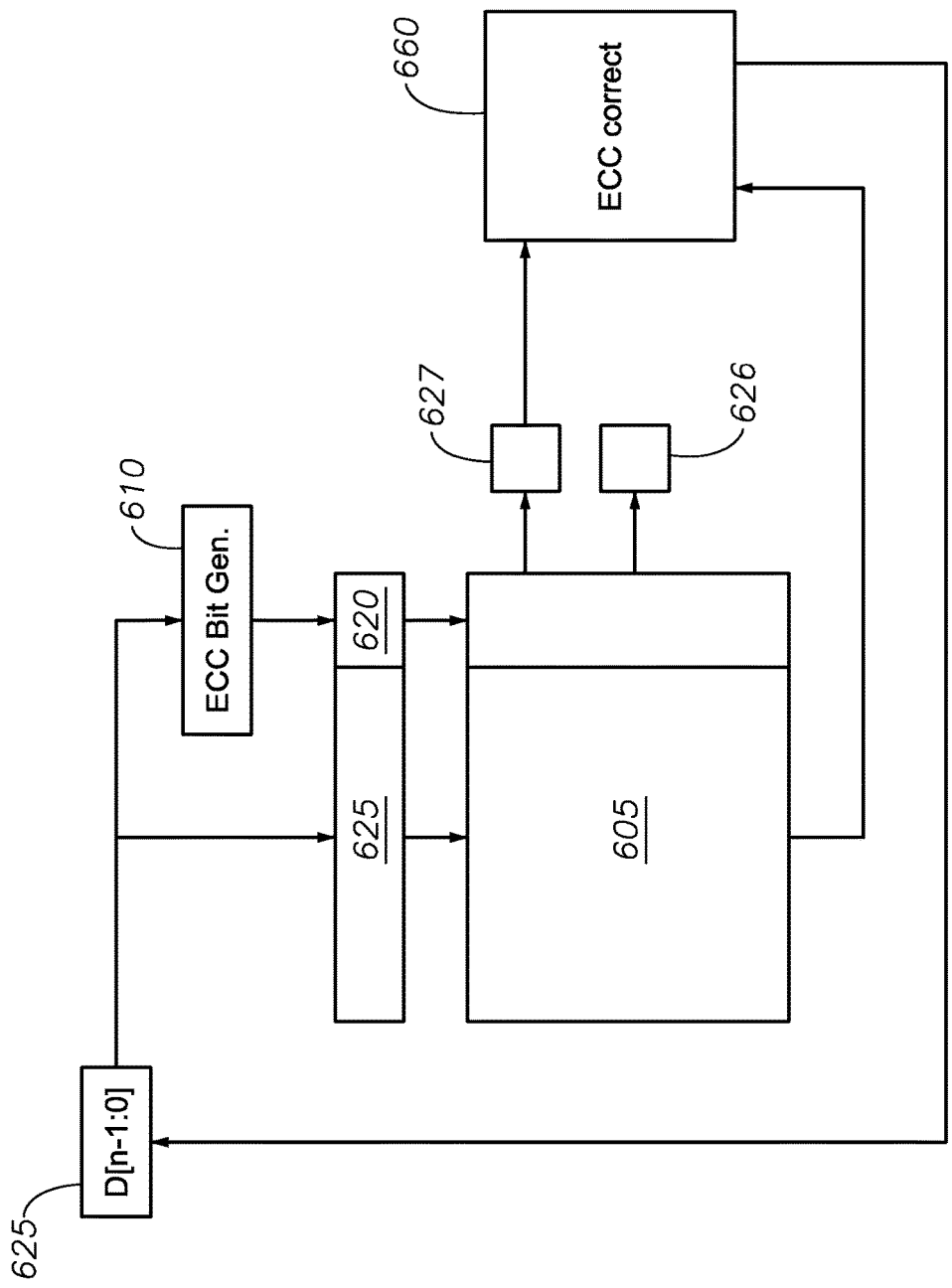
FIG. 6 illustrates a block diagram of a memory array which utilizes inline ECC detection circuitry and ECC correction circuitry in accordance with various implementations described herein.

FIG. 6 illustrates a block diagram of a memory array 605 which utilizes inline ECC detection circuitry (not shown) and ECC correction circuitry 660 in accordance with various implementations described herein. In addition, the memory array 605 may also utilize ECC bit generation circuitry 610.

Memory array 605 may be similar to the memory array 105 as described above. In particular, the memory array 605 may be configured to receive a plurality of data bits during a write operation, where the data bits are to be written into a particular row of memory cells of the array 605. The memory cells may be implemented using flip-flops and/or any other circuitry known to those skilled in the art. As shown in FIG. 6, for each write operation, a data word 625 composed of n data bits may be written to a row of the array 605. The data word may also be designated as D[n−1:0] in FIG. 6. In implementations where the memory array 605 is a multiport array, the data word 625 may be written to the array 605 using one of a plurality of write ports.

Prior to the write operation, the data word 625 may be transmitted to the ECC bit generation circuitry 610 to generate a plurality of ECC check bits 620, where the ECC check bits 620 may be derived based on the data bits of the data word 625. The ECC bit generation circuitry 610 may be similar to the ECC bit generation circuitry 210 discussed above.

The ECC check bits 620 generated by the circuitry 610 may be stored with the data word 625 into a particular row of the memory array 605. In particular, the data word 625 and the ECC check bits 620 may be written into the same row of the array 605. In one implementation, and as shown in FIG. 6, the ECC check bits 620 may be written to memory cells that are positioned to the immediate right of the stored data word 625 in the array 605.

After writing the data word 625 and the ECC check bits 620 into a row of the array 605, inline ECC detection circuitry (not shown) may be used to detect one or more bit errors in the stored data word 625. Similar to the inline parity checking circuitry discussed above, the inline ECC detection circuitry may be disposed in a layout area of the memory array 605, where each row of the array 605 may be coupled to a respective inline ECC detection circuitry.

The inline ECC detection circuitry for a row may be composed of combinational logic circuitry configured to do a bit error check for the row. In particular, the occurrence of one or more bit errors in the data word 625 stored in the row may be continuously monitored by the inline ECC detection circuitry. Further, the coupling of the inline ECC detection circuitry to rows of the array 605 may allow for the circuitry to operate without the need for a read operation of the rows.

The inline ECC detection circuitry may constructed similarly to the ECC detection circuitry 250 discussed above. In particular, the inline ECC detection circuitry may be coupled to a particular row of the array 605, and may be configured to receive the stored data word 625 from the row. The inline ECC detection circuitry may also include bit generating circuitry (not shown) and syndrome generating circuitry (not shown). The bit generating circuitry and syndrome generating circuitry may be similar to their counterparts as described above with respect to FIG. 4.

In particular, the bit generating circuitry may receive the stored data word 625. Similar to the ECC bit generation circuitry 610 discussed above, the bit generating circuitry may be used to generate a plurality of second ECC check bits, where the second ECC check bits may be derived based on the data bits of the stored data word 625. The combinational logic of the bit generating circuitry and the ECC bit generation circuitry 610 may the same.

The syndrome generating circuitry may receive the second ECC check bits from the bit generating circuitry. In addition, the syndrome generating circuitry may also receive the stored ECC check bits 620 from the row. The syndrome generating circuitry may include circuitry used to compare the stored ECC check bits 620 to the second ECC check bits.

Based on the comparison, if the stored ECC check bits 620 and the second ECC check bits do not match, then the syndrome generating circuitry may generate one or more error flag values 626 to be read by the processor and/or the like, where the one or more error flag values 626 may indicate to the processor that a corrected version of the stored data word 625 is to be written to the memory array 605 at a later time. The following implementations may describe the use of a single error flag value 626, though other implementations may use a plurality of error flag values 626, as known to those skilled in the art.

If the check bits match, then no error flag value 626 may be generated and no further corrective action may be taken. In another implementation, the syndrome generating circuitry may generate the flag bit value 626 in a concurrent fashion, where the flag bit value 626 is generated simultaneously or substantially near simultaneously with the occurrence of the bit error in the stored data word 625.

Further, if the check bits do not match, then the comparison of the stored ECC check bits 620 to the second ECC check bits may yield a position 627 of the bit errors in the stored data word 625. This position 627 may also be referred to as the syndrome.

The inline ECC detection circuitry may transmit the position 627 of the bit error to the ECC correction circuitry 660 to correct the stored data word 625. In addition, the stored data word 625 may be read out of the array 605 and transmitted to the ECC correction circuitry 660. In one implementation, to correct the stored data word 625, the ECC correction circuitry 660 may invert the data bit corresponding to the position 627 received from the inline ECC detection circuitry.

The resulting corrected data word may be written to the memory array 605. In one implementation, the corrected data word may replace the stored data word 625 in the array 605. In another implementation, the memory controller may use the error flag value 626 to begin scheduling a write operation for the corrected data word. The memory controller may schedule such a write operation during idle cycles of read and/or write operations on the array 605. In some implementations, the inline error detection circuitry and the ECC correction circuitry 660 may be used to detect multiple bit errors, while correcting a single bit error.

Figure 7:
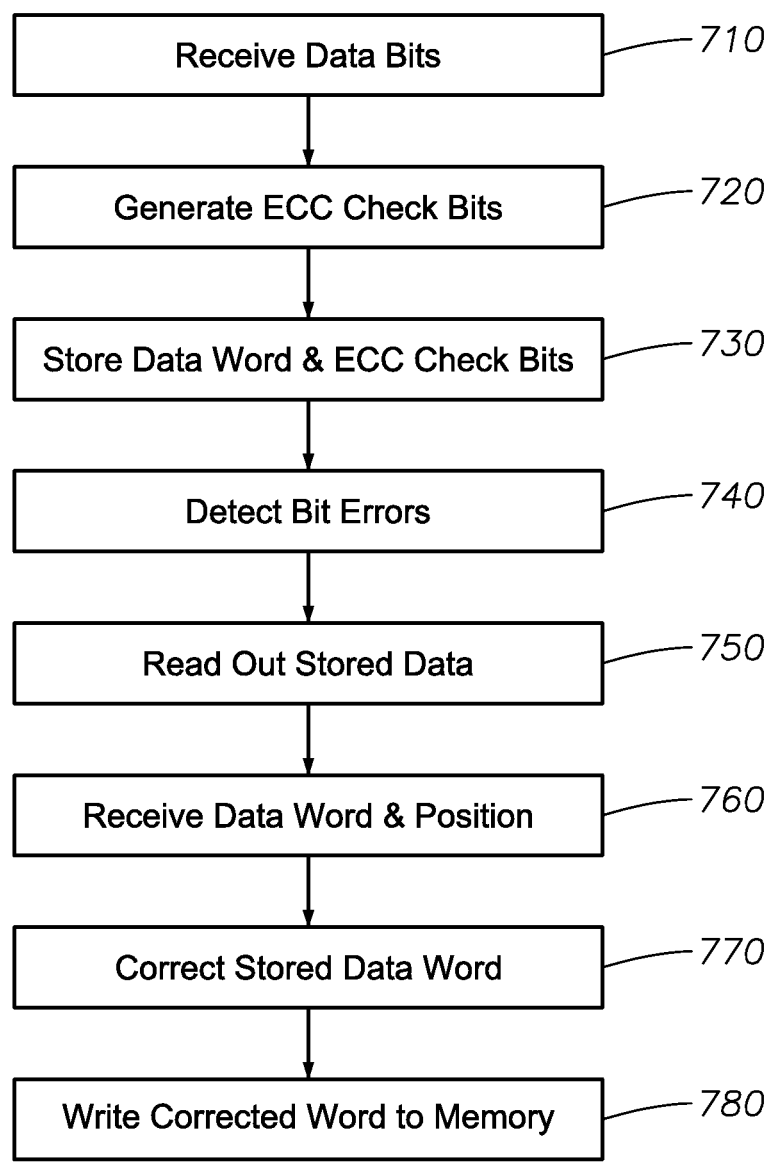
FIG. 7 illustrates a process flow diagram for a method of performing an inline error detection and an error correction on a memory array in accordance with various implementations described herein.

FIG. 7 illustrates a process flow diagram for a method 700 of performing an inline error detection and an error correction on a memory array in accordance with various implementations described herein. It should be understood that while method 700 indicates a particular order of execution of operations, in some implementations, certain portions of the operations might be executed in a different order, and on different systems. Further, in some implementations, additional operations or blocks may be added to the method. Likewise, some operations or blocks may be omitted.

At block 710, a memory array may be configured to receive a plurality of data bits during a write operation. In particular, the data bits of a data word may be written into a particular row of memory cells of the array.

At block 720, one or more ECC check bits may be generated using ECC bit generation circuitry based on the data bits. The ECC check bits may be generated prior to the write operation mentioned at block 710. The ECC bit generation circuitry may be composed of combinational logic configured to generate the ECC check bits based on error-correcting codes.

At block 730, the data word and the generated ECC check bits may be stored into a particular row of the memory array. In particular, the data word and the ECC check bits may be written into the same row of the array.

At block 740, one or more bit errors in the stored data word may be detected using inline ECC detection circuitry. The inline ECC detection circuitry may be disposed in a layout area of the memory array, where each row of the array may be coupled to a respective inline ECC detection circuitry. In particular, each memory cell of the row may be coupled to a particular stage of its respective inline ECC detection circuitry. Further, the occurrence of a bit error in the data word stored in the row may be continuously monitored by the inline ECC detection circuitry.

If an error is detected, then the inline ECC detection circuitry may produce a position of the bit error in the stored data word and may also generate an error flag value.

At block 750, the stored data word may be read out of the memory array. The read operation may be performed during idle cycles for the memory array. At block 760, the stored data word and the position of the bit error may be received by the ECC correction circuitry.

At block 770, the ECC correction circuitry may correct the stored data word based on the position of the bit error received from the ECC detection circuitry. In one implementation, to correct the stored data word, the ECC correction circuitry may invert the data bit corresponding to the position received from the ECC detection circuitry. At block 780, the resulting corrected data word may be written to the memory array.

As discussed above, the implementations using the inline ECC detection circuitry may be used to detect and correct bit errors in a data word in a memory array. In such implementations, the bit errors may be detected in real-time or substantially near real-time, as opposed to, for example, waiting until the data word is read out of the array before performing the detection and correction operations. Performing the detection using inline ECC detection may allow for optimization of time in correcting bit errors. Further, especially for multiport memory arrays, the use of inline ECC detection may lead to a saving of power by not having to implement error detection and checking circuitry for every read port of the array. In some implementations, the inline ECC detection circuitry may be used for the detection and correction of a single bit error in a data word in a memory array. In other implementations, the inline ECC detection circuitry may be used for the detection of two bit errors in a data word, but only a single bit error may be corrected.

Horizontal and Vertical Parity Checking

In one implementation, and as further described below, to detect and correct bit errors occurring in a memory array, inline error detection circuitry in the form of a horizontal inline parity checking circuitry and vertical inline parity checking circuitry may be used. The horizontal inline parity checking circuitry may be used to detect a bit error in data stored in a row of the memory array, while the vertical inline parity checking circuitry may be used to detect a bit error in data stored in a column of the memory array.

As similarly discussed above with respect to the inline parity checking circuitry, the horizontal inline parity checking circuitry may use a horizontal parity bit that may be stored alongside a horizontal data word in a row of the array. In contrast, the vertical inline parity checking circuitry may use a vertical parity bit that may be stored alongside a vertical data word in a column of the array. Further, error correction circuitry may be used to correct the bit error based on the horizontal and vertical parity bits.

Figure 8:
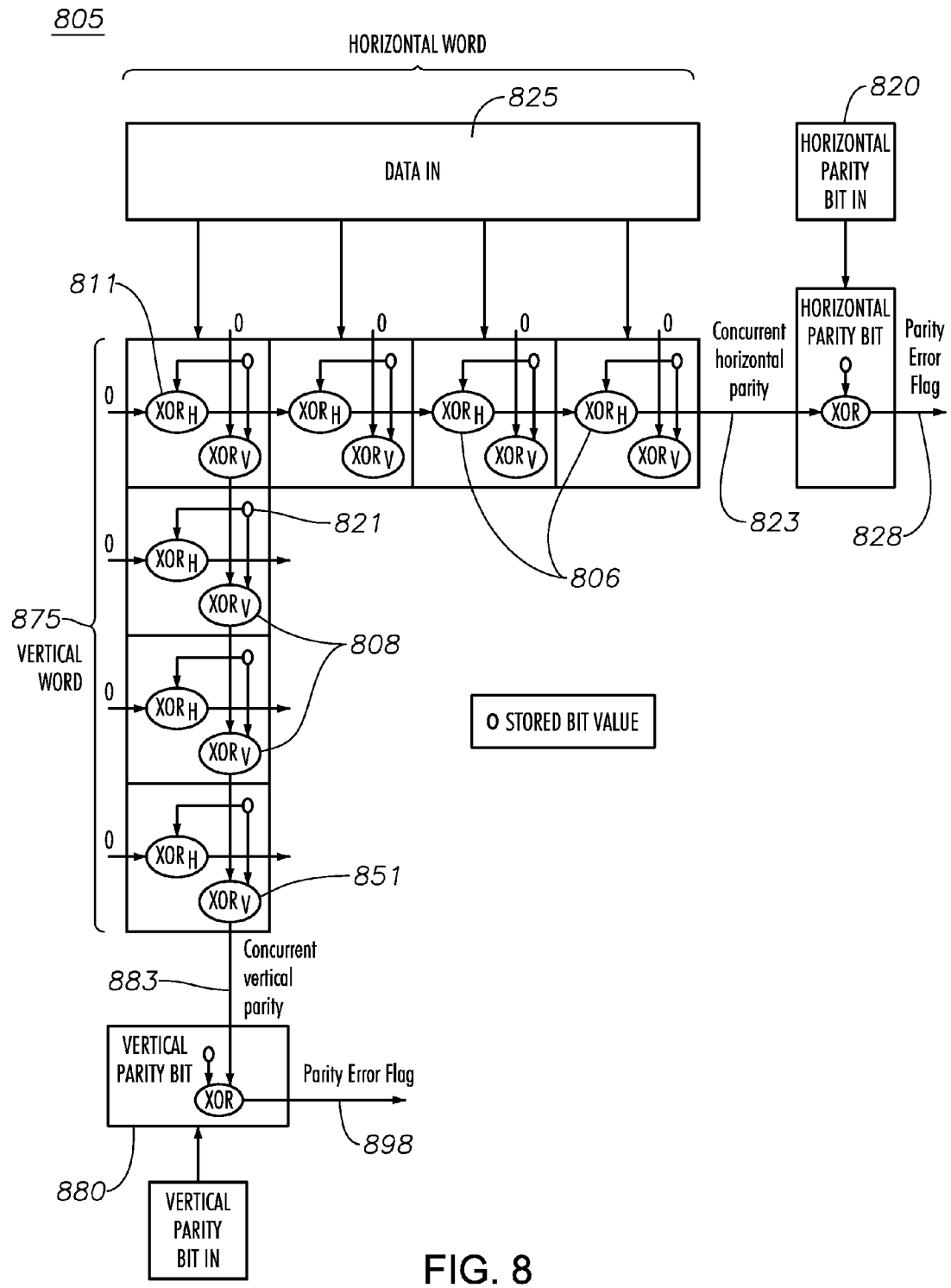
FIG. 8 illustrates a block diagram of a memory array which utilizes horizontal inline parity checking circuitry and vertical inline parity checking circuitry in accordance with various implementations described herein.

FIG. 8 illustrates a block diagram of a memory array 805 which utilizes horizontal inline parity checking circuitry 806 and vertical inline parity checking circuitry 808 in accordance with various implementations described herein.

Memory array 805 may be similar to the memory array 105 as described above. In particular, the memory array 805 may be configured to receive a plurality of data bits during a write operation, where the data bits are to be written into a particular row of memory cells of the array 805. As shown in FIG. 8, for each write operation, a horizontal data word 825 composed of n data bits may be written to a row of the array 805. In implementations where the memory array 805 is a multiport array, the horizontal data word 825 may be written to the array 805 using one of a plurality of write ports.

Prior to the write operation, the horizontal data word 825 may be transmitted to horizontal parity generation circuitry (not shown) to generate a single horizontal parity bit 820, where the horizontal parity bit 820 may be derived based on the data bits of the horizontal data word 825. The horizontal parity generation circuitry may be similar to the parity generation circuitry 215 described above. In such an implementation, the output of the horizontal parity generation circuitry may indicate whether the horizontal data word has an even or odd number of "1" bits. In a further implementation, the horizontal parity bit 820 may be set to a "0" value if there are an even number of "1" bits, or it may be set to a "1" value if there are odd numbers of "1" bits. In another implementation, the combinational logic of the horizontal parity generation circuitry may be similar to that of the horizontal inline parity checking circuitry 806, as further described below.

The horizontal parity bit 820 generated by the horizontal parity generation circuitry may be stored with the horizontal data word 825 into a particular row of the memory array 805. In particular, the horizontal data word 825 and the horizontal parity bit 820 may be written into the same row of the array 805. In one implementation, and as shown in FIG. 8, the horizontal parity bit 820 may be written to a memory cell that is positioned to the immediate right of the stored horizontal data word 825 in the array 205.

As similarly described above with respect to FIG. 2, after writing the horizontal data word 825 and the horizontal parity bit 820 into a row of the array 805, horizontal inline parity checking circuitry 806 may be used to detect a bit error in the stored horizontal data word 825. The horizontal inline parity checking circuitry 806 may be disposed in a layout area of the memory array 805, where each row of the array 805 may be coupled to a respective horizontal inline parity checking circuitry 806. In particular, each memory cell of the row may be coupled to a particular stage of its respective horizontal inline parity checking circuitry 806.

The horizontal inline parity checking circuitry 806 for a row may be composed of combinational logic circuitry configured to do a parity check for the row. In particular, the occurrence of a bit error in the horizontal data word 825 stored in the row may be continuously monitored by the horizontal inline parity checking circuitry 806. Further, the coupling of the horizontal inline parity checking circuitry 806 to rows of the array 805 may allow for the circuitry to operate without the need for a read operation of the rows.

The horizontal inline parity checking circuitry 806 for a row may generate a horizontal flag bit value 828 in the event that a bit error occurs in the horizontal data word 825 stored in the row. In particular, the circuitry 806 may generate a high value for the flag bit 828 (i.e., a logic "1" value) if the circuitry 806 detects the occurrence of a bit error. Each row of the array 805 may have its own associated flag bit 828. The flag bit value 828 may be generated using combinational logic circuitry which uses an output of the horizontal inline parity checking circuitry 806.

In another implementation, the horizontal inline parity checking circuitry 806 may generate the horizontal flag bit value 828 in a concurrent fashion, where the horizontal flag bit value 828 is generated simultaneously or substantially near simultaneously with the occurrence of the bit error in the stored horizontal data word 825. In such an implementation, the horizontal inline parity checking circuitry may be operating in real-time or substantially near real-time.

As similarly discussed above with respect to FIG. 3, the horizontal inline parity checking circuitry 806 may be composed of a linear concatenation of logic circuitry (e.g., XOR gates, XNOR gates, and/or the like), where each stage of the logic circuitry uses a data bit stored in a corresponding memory cell as an input. For example, as shown in FIG. 8, the linear concatenation of logic circuitry may be in the form of a chained set of horizontal XOR gates 811, with one horizontal XOR gate 811 (i.e., one stage of the logic circuitry) being associated with each memory cell 821 of the row.

As shown in FIG. 8, each horizontal XOR gate 811 may receive a stored data bit from its associated memory cell 821 as one input. The other input for each horizontal XOR gate 811 may be the output of the previous horizontal XOR gate 811. As shown, the leftmost horizontal XOR gate 811 may use its associated stored data bit as one input and a "0" value for the other input. In addition, the rightmost horizontal XOR gate 811 may use its associated stored horizontal parity bit 820 as one input and the output of the previous horizontal XOR gate 811 as another input. The output of this previous horizontal XOR gate 811 may be referred to as the concurrent horizontal parity bit 823. The concurrent horizontal parity bit 823 may be stable after a predetermined period of time after the horizontal data word 825 is written to the array 805.

The concurrent horizontal parity bit 823 may indicate whether there are an odd or even number of "1" bits in the stored horizontal data word 825. As shown in FIG. 8, the rightmost horizontal XOR gate 811 may be used to compare the concurrent horizontal parity bit 823 and the stored horizontal parity bit 820. The output of this rightmost horizontal XOR gate 811 may be a "1" value if these parity bits are different or may be a "0" value if these parity bits are the same. This output may be referred to as a horizontal flag bit value 828 for the row.

In another implementation, the horizontal inline parity checking circuitry 806 may include a tree or chain of horizontal XOR gates used to generate the horizontal flag bit value 828. In another implementation, the horizontal inline parity checking circuitry 806 may include combinational logic circuitry where the horizontal flag bit value 828 is computed based on a plurality of sub-word parity bits of the horizontal data word 825.

Figure 9:
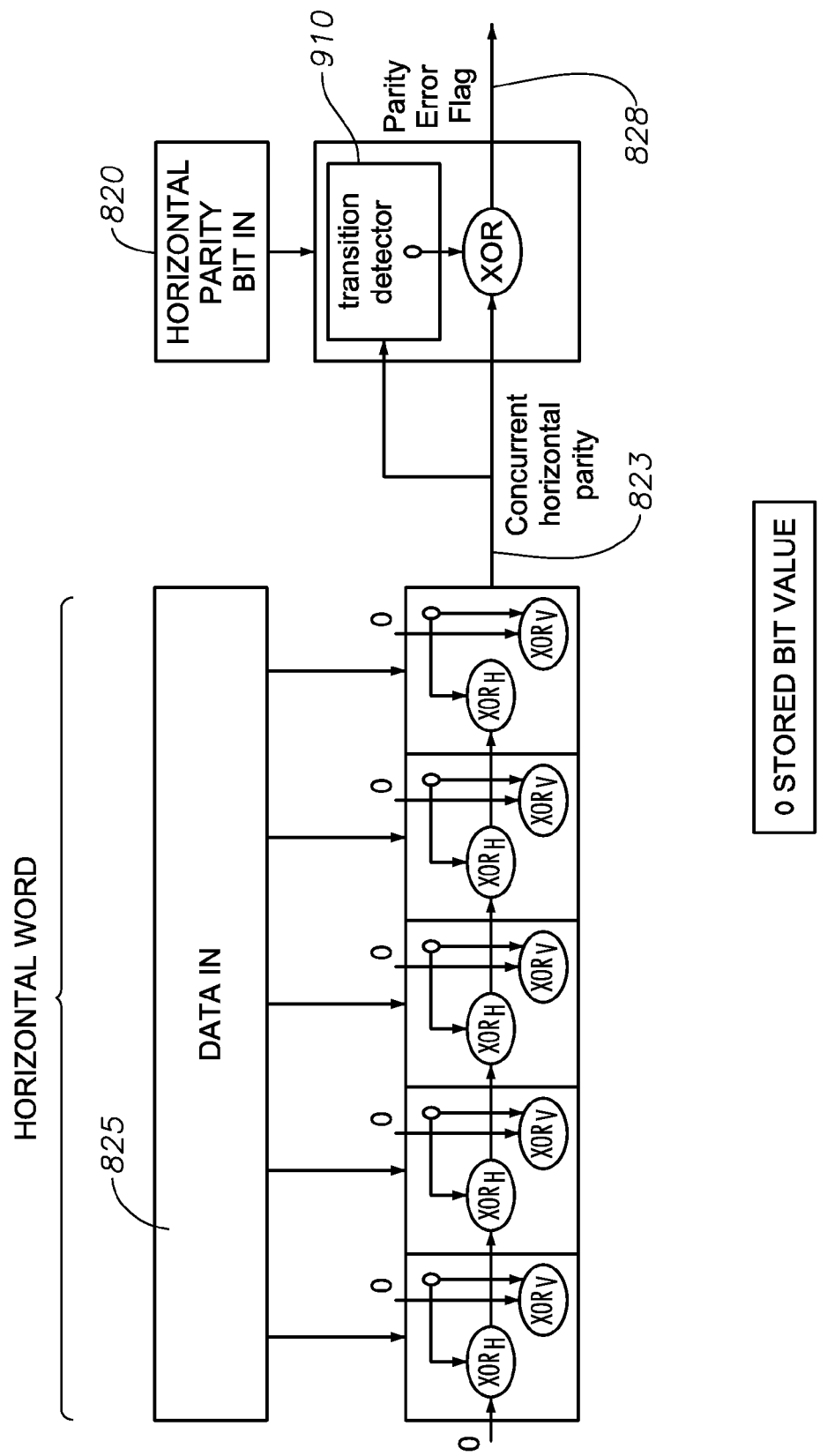
FIG. 9 illustrates a chained set of XOR gates coupled to a row of the array and using a transition detection circuitry in accordance with various implementations described herein.

In yet another implementation, a transition detection circuitry may be used with the horizontal inline parity checking circuitry 806. FIG. 9 illustrates a chained set of horizontal XOR gates 811 coupled to a row of the array 805 and using a transition detection circuitry 910 in accordance with various implementations described herein. In FIG. 9, the chained set of horizontal XOR gates 811 may be similarly linearly concatenated as shown in FIG. 8. In addition, as similarly described above, the rightmost horizontal XOR gate 811 may use its associated stored horizontal parity bit 820 as one input and the concurrent horizontal parity bit 823 as another input.

Returning to FIG. 8, upon writing a plurality of horizontal data words 825 to the array 805, a plurality of vertical data words 875 may be formed. As shown in FIG. 8, a vertical data word 875 composed of data bits may be formed in a column of the array 805. Further, a vertical parity bit 880 may be generated for a particular vertical data word 875 stored in a column of the array.

The vertical inline parity checking circuitry 808 may be similar to the horizontal inline parity checking circuitry 806 in that it may be composed of combinational logic circuitry (e.g., XOR gates, XNOR gates, and/or the like) configured to do a parity check. However, the vertical inline parity checking circuitry 808 may be used to detect a bit error in the stored vertical data word 875. In particular each column of the array 805 may be coupled to a respective vertical inline parity checking circuitry 808, such that the circuitry 808 may be composed of combinational logic circuitry configured to do a parity check for the column. Similar to the horizontal inline parity checking circuitry 806, an occurrence of a bit error in the vertical data word 875 stored in the column may be continuously monitored by the vertical inline parity checking circuitry 808.

In one implementation, the vertical parity bit 880 for a column may be generated based on the vertical data word 875 stored within the column. In one such implementation, the data bits of the word 875 may be read and passed through a plurality of vertical XOR operations (i.e., vertical XOR gates 851, as further described below). The result of the vertical XOR operations of data bits in the column may be stored as the vertical parity bit 880. In particular, the vertical parity bit 880 may be stored with and/or alongside the vertical data word 875 into a particular column of the memory array 805. In a further implementation, the data bits of the vertical data word 875 may be read and passed through the vertical XOR operations when an enable signal (further described below) for the memory array 805 has a low value.

In another such implementation, the vertical parity bit 880 for a column of the array 805 may be computed for every write operation. In particular, the vertical data word 875 for the column may be read out. If the new data to be written is the same as the read out data word 875, then the vertical parity 880 for the column may be unchanged. Otherwise, the vertical parity bit 880 may be inverted.

In addition, the vertical inline parity checking circuitry 808 for a column may generate a vertical flag bit value 898 in the event that a bit error has occurred in the vertical data word 875 stored in the column. In particular, the circuitry 808 may generate a high value for the flag bit 898 (i.e., a logic "1" value) if the circuitry 808 detects the occurrence of a bit error. Each column of the array 805 may have its own associated flag bit 898. The flag bit value 898 may be generated using combinational logic circuitry which uses an output of the vertical inline parity checking circuitry 808.

Further, the vertical inline parity checking circuitry 808 may generate the vertical flag bit value 898 in a concurrent fashion, where the vertical flag bit value 898 is generated simultaneously or substantially near simultaneously with the occurrence of the bit error in the stored horizontal data word 875. In such an implementation, the vertical inline parity checking circuitry 808 may be operating in real-time or substantially near real-time.

As similarly discussed above with respect to the circuitry 806, the vertical inline parity checking circuitry 808 may be composed of a linear concatenation of logic circuitry, where each stage of the logic circuitry uses a data bit stored in a corresponding memory cell as an input. For example, as shown in FIG. 8, the linear concatenation of logic circuitry may be in the form of a chained set of vertical XOR gates 851, with one vertical XOR gate 851 (i.e., one stage of the logic circuitry) being associated with each memory cell 821 of the column.

As shown in FIG. 8, each vertical XOR gate 851 may receive a stored data bit from its associated memory cell 821 as one input. The other input for each vertical XOR gate 851 may be the output of the previous vertical XOR gate 851. As shown, the topmost vertical XOR gate 851 may use its associated stored data bit as one input and a "0" value for the other input. In addition, the bottommost vertical XOR gate 851 may use its associated stored vertical parity bit 880 as one input and the output of the previous vertical XOR gate 851 as another input. The output of the previous vertical XOR gate 851 may be referred to as the concurrent vertical parity bit 883.

The concurrent vertical parity bit 883 may indicate whether there are an odd or even number of "1" bits in the stored vertical data word 875. As shown in FIG. 8, the bottommost vertical XOR gate 851 may be used to compare the concurrent vertical parity bit 883 and the stored vertical parity bit 880. The output of this bottommost vertical XOR gate 851 may be a "1" value if these parity bits are different or may be a "0" value if these parity bits are the same. This output may be referred to as a vertical flag bit value 898 for the column.

Figure 10:
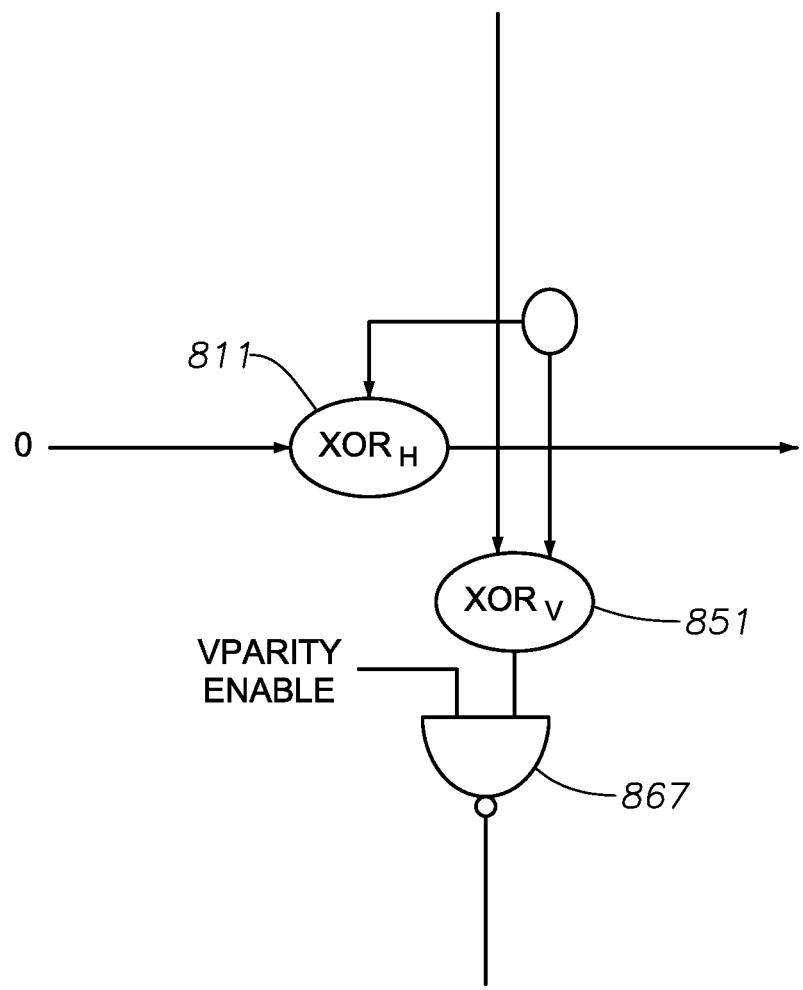
FIG. 10 illustrates a chained set of vertical XOR gates coupled to a NAND gate in accordance with various implementations described herein.

In one implementation, the chained set of vertical XOR gates 851 may also include combinational logic configured to incorporate an enable signal. FIG. 10 illustrates a chained set of vertical XOR gates 851 coupled to NAND gate 867 in accordance with various implementations described herein. As shown, one input to the NAND gate 867 may be an enable signal and the other input may be an output of a vertical XOR gate 851. In such an implementation, the enable signal may stay low for as long as the memory array 805 may be accessed for a write operation. In the event that the array 805 goes into sleep or is going to be clock gated for a large number of cycles, the enable signal may be turned to a high value. The enable signal may also go to a high value when the memory array 805 may be accessed only through one or more read ports for a larger number of cycles. When the enable signal is a high value, the concurrent vertical parity bit 883 may be computed.

In another implementation, in the event of one or more bit errors during a power down or clock gated mode, at least one of the vertical flag bit value 898 or the horizontal flag bit value 828 may reach a high value. A memory controller may determine a location of the error at its horizontal and vertical positions within the array 805 based on the vertical flag bit value 898 and/or the horizontal flag bit value 828. In particular, the memory controller may determine the row of the horizontal data word 825 and the column of the vertical data word 875 containing the bit error. The memory controller may then enable two memory cycles. During the first memory cycle, error correction circuitry may read out the horizontal data word 825 containing the bit error. During the second memory cycle, the error correction circuitry may invert the bit in the horizontal data word 825 corresponding to the column in which the bit error occurred. The corrected horizontal data word may then be written back to the memory array 805. In addition, the corresponding horizontal and vertical stored parity bits may be updated. Further, the memory array 805 may also return to a sleep mode or a clock gated mode.

In yet another implementation, in the event of one or more bit errors and with at least one of the vertical flag bit value 898 or the horizontal flag bit value 828 reaching a high value, the horizontal word 825 containing the bit error may be invalidated. In a further implementation, the entire memory array 805 may be invalidated.

In another implementation, in the event of one or more bit errors, and where the vertical parity bit 880 for a column of the array 805 is computed for every write operation (as described above), a memory controller may compute the concurrent vertical parity bit 883 and determine positions of the one or more bit errors. In one such implementation, the concurrent vertical parity bit 883 may be computed by blocking read operations to the locations of the one or more bit errors. Then, in a background operation, the other data bits of the vertical data word 875 containing the bit error may be read and passed through vertical XOR gates 851, thereby producing the concurrent vertical parity bit 883. In another such implementation, the concurrent vertical parity bit 883 may be computed by blocking read operations to the locations of the one or more bit errors, and by blocking write operations to the memory array 805. The enable signal as discussed above may then be set to a high value, thereby allowing the concurrent vertical parity bit 883 to be computed using the vertical XOR gates 851. Further, upon determining the positions of the one or more bit errors, the error correction circuitry may be used to correct the one or more bit errors.

As discussed above, the implementations using the horizontal inline parity checking circuitry and the vertical inline parity checking circuitry may be used to detect and correct bit errors in a data word in a memory array. In such implementations, the bit errors may be detected in real-time or substantially near real-time, as opposed to, for example, waiting until the data word is read out of the array before performing the detection and correction operations. Performing the detection using inline parity checking may allow for optimization of time in correcting bit errors. Further, especially for multiport memory arrays, the use of inline parity checking may lead to a saving of power and/or area by not having to implement error detection and checking circuitry for every read port of the array. In addition, the use of inline parity checking may lead to a detection of bit errors before such errors may accumulate in the array.

In some implementations, error correction may be performed if the bit error occurs during a sleep or clock gated phase, or, in another scenario, if only read operations and no write operations are occurring. In other implementations, if the memory array operates at a low frequency, then error detection and/or correction may be performed during write operations. In another implementation, an odd number of bit errors may be detected using the horizontal inline parity checking circuitry and the vertical inline parity checking circuitry.

The description provided herein may be directed to specific implementations. It should be understood that the discussion provided herein is provided for the purpose of enabling a person with ordinary skill in the art to make and use any subject matter defined herein by the subject matter of the claims.

It should be intended that the subject matter of the claims not be limited to the implementations and illustrations provided herein, but include modified forms of those implementations including portions of implementations and combinations of elements of different implementations in accordance with the claims. It should be appreciated that in the development of any such implementation, as in any engineering or design project, numerous implementation-specific decisions should be made to achieve a developers' specific goals, such as compliance with system-related and business related constraints, which may vary from one implementation to another. Moreover, it should be appreciated that such a development effort may be complex and time consuming, but would nevertheless be a routine undertaking of design, fabrication, and manufacture for those of ordinary skill having benefit of this disclosure.

Reference has been made in detail to various implementations, examples of which are illustrated in the accompanying drawings and figures. In the detailed description, numerous specific details are set forth to provide a thorough understanding of the disclosure provided herein. However, the disclosure provided herein may be practiced without these specific details. In some other instances, well-known methods, procedures, components, circuits and networks have not been described in detail so as not to unnecessarily obscure details of the embodiments.

It should also be understood that, although the terms first, second, etc. may be used herein to describe various elements, these elements should not be limited by these terms. These terms are only used to distinguish one element from another. For example, a first element could be termed a second element, and, similarly, a second element could be termed a first element. The first element and the second element are both elements, respectively, but they are not to be considered the same element.

The terminology used in the description of the disclosure provided herein is for the purpose of describing particular implementations and is not intended to limit the disclosure provided herein. As used in the description of the disclosure provided herein and appended claims, the singular forms "a," "an," and "the" are intended to include the plural forms as well, unless the context clearly indicates otherwise. The term "and/or" as used herein refers to and encompasses any and all possible combinations of one or more of the associated listed items. The terms "includes," "including," "comprises," and/or "comprising," when used in this specification, specify a presence of stated features, integers, steps, operations, elements, and/or components, but do not preclude the presence or addition of one or more other features, integers, steps, operations, elements, components and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. The terms "up" and "down"; "upper" and "lower"; "upwardly" and "downwardly"; "below" and "above"; and other similar terms indicating relative positions above or below a given point or element may be used in connection with some implementations of various technologies described herein.

While the foregoing is directed to implementations of various techniques described herein, other and further implementations may be devised in accordance with the disclosure herein, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An integrated circuit, comprising:
a memory array having a plurality of rows of memory cells, wherein a respective row is configured to store a data word and one or more check bits corresponding to the data word, wherein the one or more check bits comprise one or more parity bits, and wherein the one or more parity bits are generated using the data word prior to the data word being written to the respective row;
error-correcting code (ECC) bit generation circuitry configured to generate a plurality of first ECC bits based on the data word prior to the data word being written to the respective row;
inline error detection circuitry coupled to the respective row and configured to generate one or more flag bit values based on a detection of one or more bit errors in the data word stored in the respective row;
error correction circuitry configured to correct the one or more bit errors in the data word stored in the respective row in response to the one or more generated flag bit values; and ECC detection circuitry, wherein, based on the one or more generated flag bit values indicating the one or more bit errors in the data word, the ECC detection circuitry is configured to:
  receive the data word from the respective row;
  receive the first ECC bits corresponding to the data word;
  generate a plurality of second ECC bits based on the data word received from the respective row;
  compare the first ECC bits to the second ECC bits;
  determine a position of the one or more bit errors in the data word based on the comparison; and
  transmit the position of the one or more bit errors to the error correction circuitry.

2. The integrated circuit of claim 1, wherein the inline error detection circuitry is configured to detect the one or more bit errors in the data word in substantially near real-time based on the one or more check bits.

3. The integrated circuit of claim 1, wherein the inline error detection circuitry comprises inline parity checking circuitry, and wherein the inline parity checking circuitry comprises one or more exclusive-OR (XOR) gates, one or more exclusive-NOR (XNOR) gates, or combinations thereof.

4. The integrated circuit of claim 1, wherein the first ECC bits are written to an ECC array disposed separately from the memory array.

5. The integrated circuit of claim 1, wherein the error correction circuitry comprises ECC correction circuitry, and wherein the ECC correction circuitry is configured to:
  receive the data word from the respective row;
  correct the one or more bit errors in the data word based on the position of the bit error; and
  transmit the corrected data word to the memory array for a write operation.

6. An integrated circuit, comprising:
  a memory array having a plurality of rows of memory cells, wherein a respective row is configured to store a data word and one or more check bits corresponding to the data word, wherein the one or more check bits comprises a plurality of first error-correcting code (ECC) bits;
  ECC bit generation circuitry configured to generate a plurality of first ECC bits using the data word prior to the data word being written to the respective row;
  inline error detection circuitry coupled to the respective row and configured to generate one or more flag bit values based on a detection of one or more bit errors in the data word stored in the respective row; and
  error correction circuitry configured to correct the one or more bit errors in the data word stored in the respective row in response to the one or more generated flag bit values;
  wherein the inline error detection circuitry comprises ECC detection circuitry, wherein the ECC detection circuitry is configured to:
    generate a plurality of second ECC bits based on the data word stored in the respective row;
    compare the first ECC bits to the second ECC bits;
    determine a position of the one or more bit errors in the data word based on the comparison;
    generate the one or more flag bit values indicating the one or more bit errors in the data word; and
    transmit the position of the one or more bit errors to the error correction circuitry.

7. The integrated circuit of claim 6, wherein the error correction circuitry comprises ECC correction circuitry, and wherein, in response to the one or more generated flag bit values, the ECC correction circuitry is configured to:
  receive the data word from the respective row;
  correct the one or more bit errors in the data word based on the position of the one or more bit errors; and
  transmit the corrected data word to the memory array for a write operation.

8. A method, comprising:
  generating one or more check bits based on a data word, wherein generating the one or more check bits comprises generating one or more parity bits using parity bit generation circuitry;
  generating a plurality of first error-correcting code (ECC) bits using ECC bit generation circuitry based on the data word prior to the data word being written to a row of a memory array;
  storing the data word and the one or more check bits to the row using a memory controller;
  performing a detection of one or more bit errors in the stored data word using inline error detection circuitry coupled to the row;
  using ECC detection circuitry upon performing the detection of the one or more bit errors, comprising:
    receiving the data word from the respective row;
    receiving the first ECC bits corresponding to the data word;
    generating a plurality of second ECC bits based on the data word received from the respective row;
    comparing the first ECC bits to the second ECC bits;
    determining a position of the one or more bit errors in the data word based on the comparison; and
    transmitting the position of the one or more bit errors to error correction circuitry; and
  correcting the one or more bit errors in the stored data word using the error correction circuitry.

9. The method of claim 8, wherein performing the detection of the one or more bit errors comprises performing the detection using a plurality of exclusive-OR (XOR) gates, one or more exclusive-NOR (XNOR) gates, or combinations thereof.

10. A method, comprising:
  generating one or more check bits based on a data word using error-correcting code (ECC) bit generation circuitry, wherein the one or more check bits comprise a plurality of first ECC bits;
  storing the data word and the one or more check bits to a row of a memory array using a memory controller;
  performing a detection of one or more bit errors in the stored data word using inline error detection circuitry coupled to the row, wherein performing the detection of the one or more bit errors comprises performing the detection using inline ECC detection circuitry, and further comprising:
    generating a plurality of second ECC bits based on the data word stored in the respective row;
    comparing the first ECC bits to the second ECC bits;
    determining a position of the one or more bit errors in the data word based on the comparison;
    generating one or more flag bit values indicating the one or more bit errors in the data word; and
    transmitting the position of the one or more bit errors to error correction circuitry; and
  correcting the one or more bit errors in the stored data word using the error correction circuitry.

11. An integrated circuit, comprising:
a memory array, comprising:
- a plurality of rows of memory cells, wherein a respective row is configured to store a horizontal data word and a horizontal parity bit corresponding to the horizontal data word; and
- a plurality of columns of memory cells, wherein a respective column is configured to store a vertical data word and a vertical parity bit corresponding to the vertical data word; and a plurality of error detection circuitry, comprising:
- inline horizontal error detection circuitry coupled to the respective row and configured to generate a horizontal flag bit value if the inline horizontal error detection circuitry detects one or more bit errors in the horizontal data word stored in the respective row, wherein the inline horizontal error detection circuitry comprises inline horizontal parity generation circuitry composed of a plurality of horizontal combinational logic gates configured to use the horizontal data word as input; and
- inline vertical error detection circuitry coupled to the respective column and configured to generate a vertical flag bit if the inline vertical error detection circuitry detects one or more bit errors in the vertical data word stored in the respective column, wherein the inline vertical error detection circuitry comprises inline vertical parity generation circuitry composed of a plurality of vertical combinational logic gates configured to use the vertical data word as input.

* * * * *